United States Patent [19]

Haemmerle et al.

[11] Patent Number: 5,439,782
[45] Date of Patent: Aug. 8, 1995

[54] METHODS FOR MAKING MICROSTRUCTURES

[75] Inventors: William H. Haemmerle, Florham Park; William M. MacDonald, Lebanon; Casimir R. Nijander, Lawrenceville; Joseph Shmulovich, Murray Hill; Wesley P. Townsend, Princeton; Yiu-Huen Wong, Summit, all of N.J.

[73] Assignee: AT&T Corp., Murray Hill, N.J.

[21] Appl. No.: 165,203

[22] Filed: Dec. 13, 1993

[51] Int. Cl.[6] .............................................. G02B 6/12
[52] U.S. Cl. ................................... 430/321; 430/320; 430/330; 430/323; 385/43; 385/129; 385/131; 385/130
[58] Field of Search ................. 385/129, 43, 131, 130; 430/330, 320, 321, 323

[56] References Cited

U.S. PATENT DOCUMENTS

| | | | |
|---|---|---|---|
| 3,993,963 | 11/1976 | Logan et al. | 331/94.5 |
| 4,375,312 | 3/1983 | Tangonan | 430/321 |
| 4,689,291 | 8/1987 | Popovic et al. | 430/330 |
| 4,944,838 | 7/1990 | Koch et al. | 156/652 |
| 5,079,130 | 1/1992 | Derkits | 430/321 |
| 5,138,687 | 8/1992 | Horie et al. | 385/131 |
| 5,182,787 | 1/1993 | Blonder et al. | 385/131 |
| 5,193,137 | 3/1993 | Hoshino et al. | 385/129 |
| 5,208,892 | 5/1993 | Burack et al. | 385/129 |
| 5,230,990 | 7/1993 | Iwasaki et al. | 430/330 |
| 5,265,177 | 11/1993 | Cho et al. | 385/43 |
| 5,332,690 | 7/1994 | Cho et al. | 385/131 |
| 5,370,768 | 12/1994 | Mersereau et al. | 430/321 |

FOREIGN PATENT DOCUMENTS

| 2131450 | 2/1973 | Germany | 385/132 |
|---|---|---|---|
| 1-307228 | 12/1989 | Japan | 430/330 |

OTHER PUBLICATIONS

"Efficient Coupling of a Semiconductor Laser to an Optical Fiber by Means of a Tapered Optical Waveguide," Y. Shani et al., Applied Physics Letters, vol. 55, No. 23, Dec. 4, 1989, p. 2389.

"Taper Couplers for GaAs-$Al_xGa_{1-x}$ As Waveguide Layers Produced by Liquid Phase and Molecular Beam Epitaxy", by J. L. Merz et al., Applied Physics Letters, vol. 26, No. 6, Mar. 15, 1975, pp. 337-340.

Primary Examiner—Charles L. Bowers, Jr.
Assistant Examiner—Martin J. Anagebranndt
Attorney, Agent, or Firm—Roderick B. Anderson

[57] ABSTRACT

Tapered optical waveguides (33') can be easily made by using photolithographic masking and etching to define on a substrate (21) a first polymer structure (22) having a substantially uniform thickness and a tapered width. The first polymer structure is heated sufficiently to form a meniscus along its entire length. The fluidity causes the material to redistribute itself such that, rather than being of uniform thickness, it has a thickness that varies with its width; consequently, the thickness as well as the width of the first polymer structure becomes tapered. The first polymer is cooled and hardened to form a second polymer structure (22') that has a tapered width and a tapered thickness as is desirable for a tapered optical waveguide. The second polymer structure itself can be used as a tapered optical waveguide, or it can be used to control the reactive ion etching of the underlying substrate. In the latter case, the configuration of the tapered second polymer structure is replicated in a glass substrate, for example, which then may be used as a glass tapered optical waveguide (33').

12 Claims, 3 Drawing Sheets

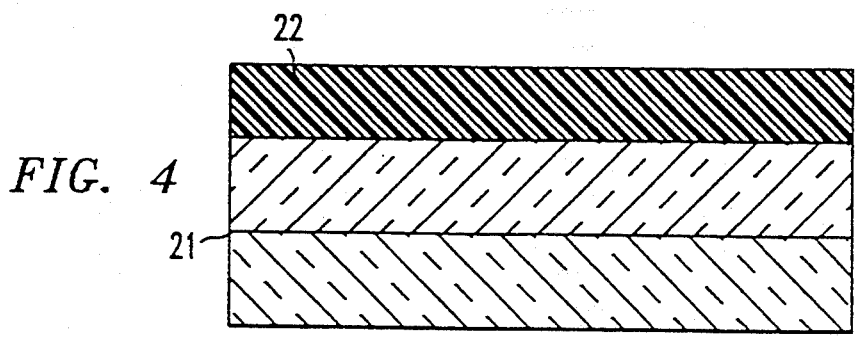
FIG. 4
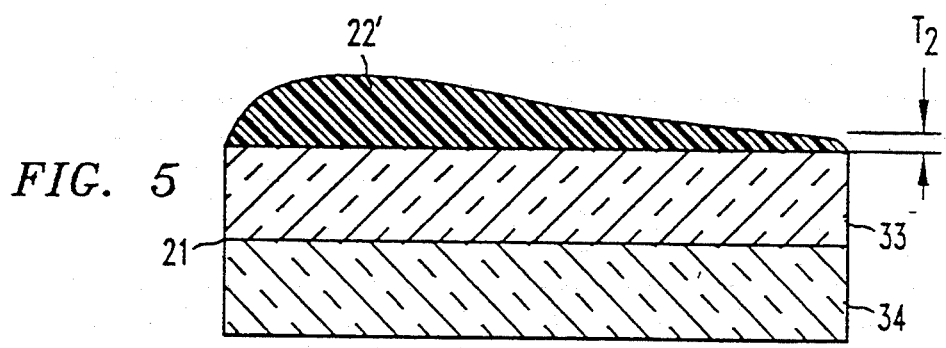
FIG. 5
FIG. 6
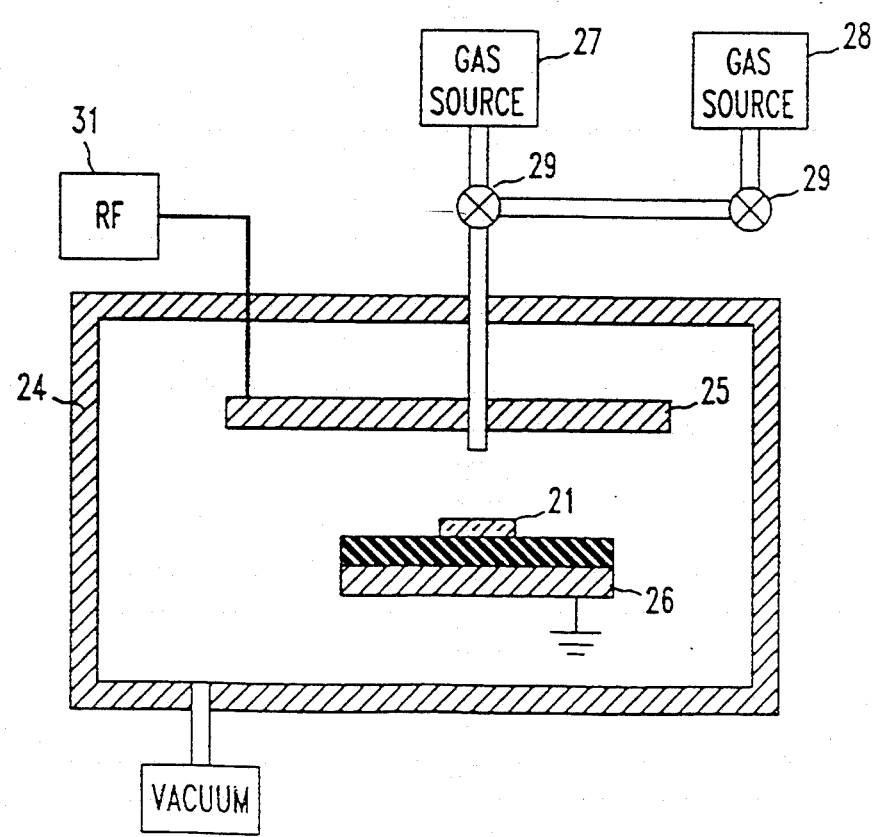

METHODS FOR MAKING MICROSTRUCTURES

TECHNICAL FIELD

This invention relates to methods for making and using microstructures and, more particularly, to methods for making and using optical waveguide structures.

BACKGROUND OF THE INVENTION

Because of the increased importance of lightwaves for transmitting information, considerable work has been done in recent years to develop techniques for operating on transmitted information-carrying light to produce various device functions. Such devices usually require optical waveguides such as optical fibers, lasers for generating light, and photodetectors for detecting light. Lenses are usually used to couple lightwaves from one component to another.

The patent of Blonder et al., U.S. Pat. No. 5,182,787, is an example of the prior art relating to planar optical waveguides. Such waveguides are defined by a thin layer of glass of high refractive index material contained between layers of glass of lower refractive index. The configuration of the high refractive index layer defines the optical path of the waveguide, which, because of its resemblance to an electronic printed circuit, is sometimes known as an optical printed circuit. The patent of Burack et al., U.S. Pat. No. 5,208,892, is an example of the prior art describing the use of thin polymer films as optical waveguides.

The most common transmission medium for lightwaves is the optical fiber, typically having a glass outer diameter of one hundred twenty-five microns and a core diameter of six microns. Lenses must normally be used for coupling light from an optical fiber to a photonics device, such as a photodetector, or to a planar optical waveguide, which typically has a smaller thickness than that of the core of the optical fiber. Each transition requiring a lens results in significant optical losses.

The Koch et al. patent, U.S. Pat. No. 4,944,838, granted Jul. 31, 1990, describes the use of tapered optical waveguides or "tapers" for more efficiently coupling light between two dissimilar devices, such as an optical fiber and a planar optical waveguide. The patent points out that prior attempts to make tapered optical waveguides lack the controllability needed to reduce losses. The solution of the patent is to use a layered semiconductor structure which is etched to form a staircase-like core or guiding structure. This constitutes a relatively complex solution, and there remains a long-felt need in the industry for methods to make tapered optical waveguides that are relatively simple and require little operator skill.

SUMMARY OF THE INVENTION

We have found that tapered optical waveguides can be easily made by defining on a substrate a first structure having a substantially uniform thickness and a tapered width. The first structure is heated sufficiently to melt it and to cause it to form a meniscus along its entire length. The resulting internal fluidity causes the material to redistribute itself such that, rather than being of uniform thickness, it acquires a thickness that varies with its width; consequently, the thickness as well as the width of the first polymer structure becomes tapered. The first structure is cooled and hardened to form a second structure that has a tapered width and a tapered thickness, as is desirable for a tapered optical waveguide. The second structure may be of an appropriate polymer which can be used as a tapered optical waveguide, or it can be used to control the reactive ion etching of the underlying substrate. With this technique, the configuration of the tapered second polymer structure is replicated in the substrate, which then may be used as a tapered optical waveguide.

These and other features, objects and benefits of the invention will be better understood from a consideration of the following detailed description taken in conjunction with the accompanying drawing.

BRIEF DESCRIPTION OF THE DRAWING

FIG. 4 is a side view of the structure of FIG. 3;

FIG. 5 is a view of the structure of FIG. 4 at a subsequent stage of fabrication;

FIG. 6 is a schematic view of reactive ion etch apparatus that may be used to etch the apparatus of FIG. 5;

DETAILED DESCRIPTION

Figure 1:
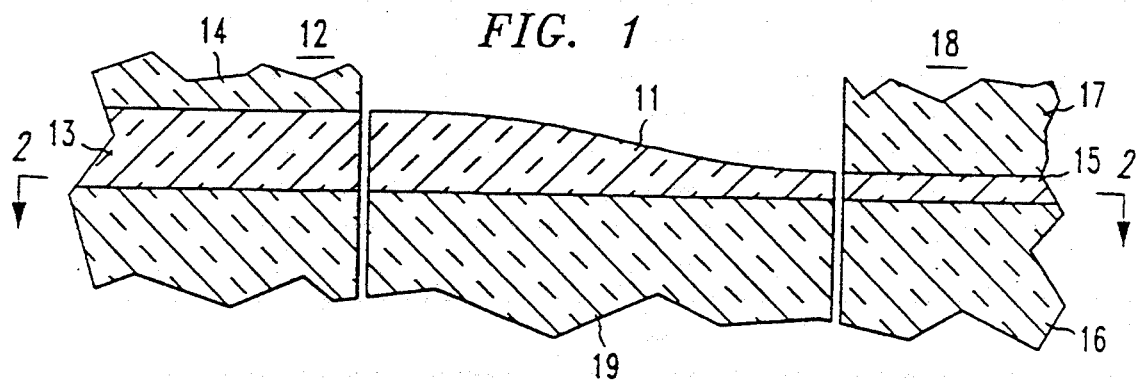
FIG. 1 is a side view of a tapered optical waveguide.

The drawings are intended to be schematic, and in some cases dimensions are distorted in the interest of clarity of exposition. Referring to FIG. 1, there is shown a tapered optical waveguide 11 for coupling light from an optical fiber 12 to a printed or planar optical waveguide 18. The tapered waveguide 11 may be abutted directly against the optical fiber 12 and the planar optical waveguide 18, rather than being separated by a small space, as shown. The optical fiber comprises a cylindrical core 13 surrounded by an annular clad layer 14, while the planar waveguide 18 comprises a planar core layer 15 surrounded by clad layers 16 and 17. The tapered optical waveguide 11 is supported on a substrate 19.

The core layers 13 and 15 and waveguide 11 may be made, for example, of glass having a relatively high refractive index, while clad layers 14, 16 and 17 and substrate 19 may be of glass having a relatively lower refractive index. The difference of refractive index confines light to the core such that light propagating along optical fiber 12 from left to right is confined within core 13 of the optical fiber. This light is coupled to optical waveguide 11 and is confined to the optical waveguide because of the lower index of refraction of substrate 19 and the surrounding air. In turn, it is coupled to planar waveguide 8 and confined within core layer 15, again because of the lower refractive index of surrounding clad layers 16 and 17.

Figure 2:
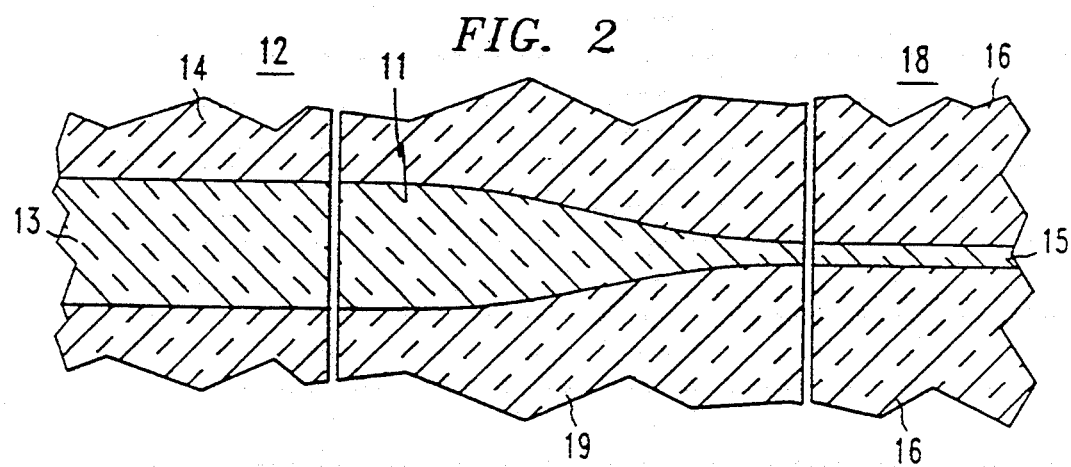
FIG. 2 is a view taken along lines 2—2 of FIG. 1.

As can be seen in FIG. 2, the optical waveguide 11 tapers in its width as well as its thickness, and the taper is relatively gradual and continuous. Under these circumstances, if, for example, the diameter of core 13 is about six microns and the thickness of the planar core layer is about 1.5 microns, the gradual taper will efficiently transfer the light energy from the optical fiber 12 to the planar waveguide 8 with little reflection or other loss. It is understood in the art that such a structure would, in many cases, be preferable to a ball lens, which is commonly used for coupling such waveguides. On the other hand, given the small dimensions of the waveguide 11, one can see that it is difficult to make using conventional techniques. Further information concerning the design and operation of tapered optical waveguides is included in the paper, "Efficient Coupling of a Semiconductor Laser to an Optical Fiber by Means of a Tapered Optical Waveguide," Y. Shani et at., *Applied Physics Letters*, Vol. 55, No. 23, Dec. 4, 1989, p. 2389.

Figure 3:
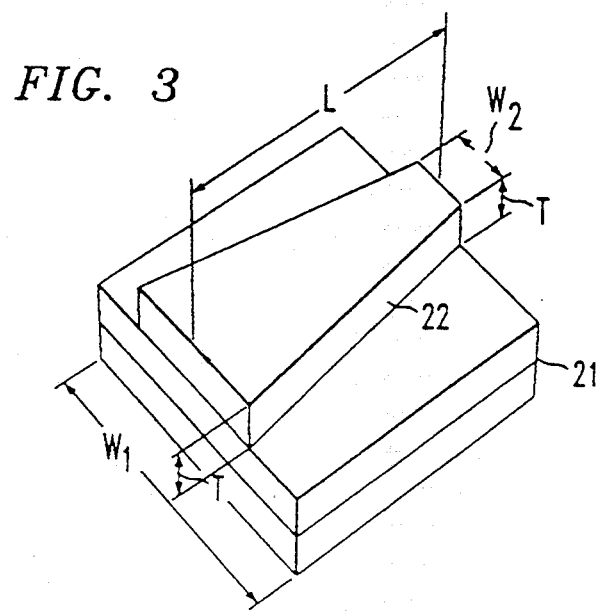
FIG. 3 is a schematic perspective view of a defined photoresist layer that may be used for making a tapered optical waveguide in accordance with an illustrative embodiment of the invention.

Referring to FIG. 3, a tapered optical waveguide, in accordance with an illustrative embodiment of the invention, is made by first defining on the surface of a substrate 21 a tapered polymer layer 22. The width W of the polymer layer is tapered, but it has a uniform thickness T. The polymer layer 22 may be a photoresist layer, which has been patterned to the shape shown by photolithographic masking and development. A side view of the structure is shown in FIG. 4. One can appreciate that the structure of FIG. 3 is quite easy to make, using conventional coating, masking and development techniques, since layer 22 has a uniform thickness.

Referring to FIG. 5, the structure of FIG. 4 is heated to a temperature sufficient to cause melting or reflow of the polymer layer 22 to form the configuration 22'. The polymer is selected such that it does not wet well to the substrate 21 and therefore does not flow easily across the surface of substrate 21. Consequently, the molten layer 22' forms a meniscus within which the polymer material inherently redistributes itself to have a thickness which is controlled by its width. That is, because the width $W_2$ of FIG. 3 is much smaller than $W_1$, the thickness $T_2$ of FIG. 5 at the end of polymer layer 22' corresponding to width $W_2$ will be much smaller than the layer thickness T of FIG. 3. This is because surface tension effects inherently eliminate corners in the fluid polymer 22', and produce instead gently sloping curved surfaces.

The polymer 22' is then hardened so that the structure of FIG. 5 is entirely solid. A top view of polymer 22' would show it to have roughly the configuration of waveguide 11 of FIG. 2. With this configuration, if the polymer layer has appropriate light transmitting and refractive index characteristics, it may be used as a tapered optical waveguide, as discussed previously. Preferably, however, it is used as an etch mask for replicating in the substrate the configuration of the polymer layer 22.

Referring to FIG. 6, the structure of FIG. 5 may be reactive ion etched (RIE) in a reactor 24 in the manner generally described in the copending application of A. Y. Feldblum et al., Ser. No. 08/024,035, filed Mar. 1, 1993, and the U.S. patent of Derkits, U.S. Pat. No. 5,079,130, granted Jan. 7, 1992, both hereby incorporated herein by reference. The RIE reactor 24 has opposite electrodes 25 and 26. A gas such as a mixture of $CHF_3$ and oxygen, supplied by sources 27 and 28 and controlled by valve devices 29, is flowed into the reactor to provide a small gas pressure within the reactor, which is otherwise evacuated. The substrate 21 to be etched is placed on an insulative member over the electrode 26, with the polymer layer up, that is, with photoresist 22' on the top surface, and subjected to the gas atmosphere, with rf power supplied, as shown by a source 31, to the electrode 25.

Figure 7:
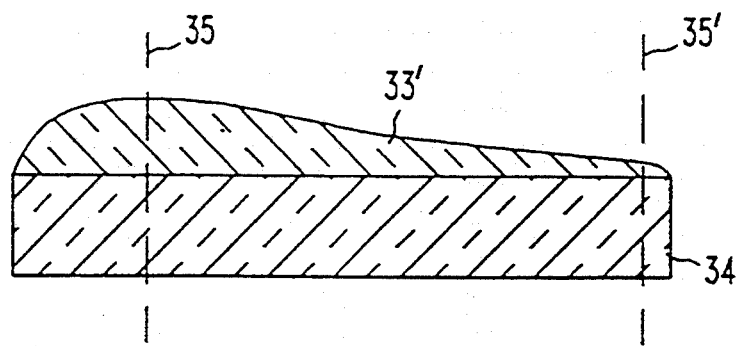
FIG. 7 is a side view of the structure of FIG. 5 at a subsequent stage of fabrication.

The reactive etch of the substrate 21 differentially etches the substrate; that is, the portion of the substrate not covered by any photoresist 22' starts to etch immediately, with other portions etching only after the photoresist directly above it has been removed by etching. This process continues until all of the polymer 22' of FIG. 5 has been etched away, leaving the original tapered configuration of the polymer 22' etched in the substrate 21. The substrate 21 may comprise a high refractive index glass layer 33 and a lower refractive index glass layer 34. The reactive ion etching is designed to etch away all of layer 33 that is not covered by polymer 22'. After the etching, the configuration of polymer 22' is etched in layer 33, as is illustrated in FIG. 7 by 33'. Thus, the tapered optical waveguide 33' is a glass waveguide, substantially identical to waveguide 11 of FIGS. 1 and 2, supported on a low refractive index substrate 34. From the foregoing, it can be appreciated that a relatively easy and straightforward method of making a glass tapered optical waveguide, which desirably tapers smoothly in both the width and thickness dimensions, has been described. If desired, the portion of the structure to the left of plane 35 and to the right of plane 35' may be cut or etched away to leave a waveguide structure 33' that more closely resembles the idealized form shown in FIG. 1.

Figure 8:
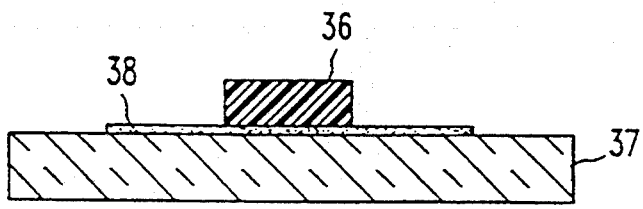
FIG. 8 is a schematic view of the structure for making an optical waveguide in accordance with another embodiment of the invention.
Figure 9:
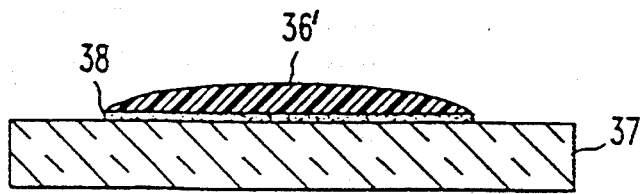
FIG. 9 is a view of the structure of FIG. 8 at a subsequent stage of fabrication.

The width and thickness of the waveguide can further be controlled by controlling the wetting of the substrate surface. For example, FIG. 8 is an end view showing a solid polymer structure 36 overlying a substrate 37. If the polymer were melted and there were no wetting of the substrate surface, the meniscus width would be substantially equal to the width of the polymer layer 36, as has been described above. However, if part of the substrate 37 has first been coated with a surfactant material 38 which the molten polymer is capable of wetting, the molten polymer 36' will spread to cover the surface of surfactant 38, as shown in FIG. 9. This illustrates that there can be a parameter for controlling the taper of the waveguide in addition to the dimensions of the polymer illustrated in FIG. 3. For example, if the polymer 36 is a photoresist of the type known as Shipley 1650, available from the Shipley Company of Newton, Mass., the surfactant layer 38 may be a thin film of water to which such molten polymer will wet. Other surfactant materials may be used with other polymers in the manner that would be understood by those skilled in the art.

The function of optical waveguide 11 of FIG. 1 of interconnecting two optical waveguides having different dimensions is only one use that may be made of tapered optical waveguides, as is understood in the art. For example, it may be used to couple an optical fiber to an active component such as a laser or a photodetector, or to any of various passive components such as filters, isolators or polarizers. The waveguide itself may be used as a filter in that, in going from a large diameter to a small diameter, the number of propagation modes of multimode light tends to decrease and, as has been recognized in the art, this phenomenon can be used to convert multimode light to single mode light. For example, with light having a wavelength in the range of about one and a half microns, the waveguide 11 of FIG. 1 may be a transverse waveguide having a thickness at one end of about 62.5 microns and a thickness at the other end of about one to two microns. As is known, transverse waveguides can be used to apply pump energy to erbium-doped planar optical waveguide amplifiers.

The following examples demonstrate the conditions, equipment and parameters we have used in making tapered optical microstructures:

EXAMPLE I

The substrate used was a four inch eight percent P-glass wafer (i.e., a silicon wafer having a coating of phosphorus-doped glass.) Shipley 1650 positive resist was spun onto a surface of the wafer at three thousand rpm and baked on a hot plate for two minutes at one hundred degrees Centigrade. The photoresist was exposed on a Karl Suss Model MA56 exposure tool for twenty seconds at 12.4 milliwatts per square centimeter. The photoresist was developed using Shipley microposit 455 developer, and the samples were rinsed in a spray/dump rinser.

After development, the photoresist structures had a width of one end of two microns which tapered to a wider mid-portion of eight microns and then tapered again to two microns at the opposite end. The total length of the structure was two thousand microns and the length of each of the tapered sections was two hundred microns. The photoresist had a uniform thickness of about five microns.

The wafer was placed on a hot plate at one hundred degrees Centigrade for two minutes. The photoresist was then reflowed by heating in a vacuum at one hundred sixty degrees for two minutes and then by heating at two hundred degrees Centigrade for two minutes. After the photoresist had cooled, the thickness of the photoresist at the two tapered ends was two microns, while it remained at about five microns in the middle of the structure. There was very little spreading of the structure.

The upper surface of the substrate was etched in a Reactive Ion Etcher manufactured by Oxford Instruments of Concord, Mass. Oxygen was flowed at 3.3 standard cubic centimeters per minute and $CHF_3$ (trifluoromethane) was flowed at forty-five sccm. The pressure was at thirty-five microns of mercury. The lower electrode material was of quartz. After reactive ion etching, it was found that the photoresist elements were replicated in the glass substrate. That is, each glass structure had a width and height of two microns at its tapered ends, and a height of five microns and a width of eight microns in its middle portion.

EXAMPLE II

This experiment was identical to the first experiment, except that the photoresist structures had a width of six microns at each end and tapered to a width of two microns at the center. The total length of each structure was seventy millimeters. The initial height of the photoresist was 5.2–5.5 microns. After reflow, the height of the photoresist at the two ends was 5.5 microns, and the height at the middle was 0.4 microns. This structure was replicated in the glass substrate by reactive ion etching, as described before.

Many other experiments were performed showing the reduction in height of the Shipley 1650 photoresist as a function of width, with subsequent reactive ion etching to give 1:1 replication.

The embodiments that have been described are intended to be merely illustrative of the inventive concept. Various other embodiments and modifications may be made by those skilled in the art without departing from the spirit and scope of the invention.

We claim:

1. A method comprising the steps of:
   defining on a glass substrate a polymer layer having a substantially uniform thickness and which tapers in width from a first end to a second end, the first end of the polymer layer being wider than the second end of the polymer layer;
   making said polymer layer to taper in thickness from the first end thereof to the second end thereof such that the first end of the polymer layer is thicker than the second end thereof;
   said making step comprising the step of heating the polymer layer of uniform thickness sufficiently to soften it and to cause its mass to be redistributed;
   the polymer layer being of a material that does not wet the substrate material, whereby, during the heating step, the polymer layer does not flow substantially on areas of the substrate surface not previously covered by said polymer layer;
   hardening said polymer layer to form a second polymer structure that has a tapered width and a tapered thickness;
   and placing the second polymer structure and substrate in an RIE reactor and reactively etching them, said reactive ion etching resulting in a substantial replication of the configuration of the second polymer structure in an upper surface of said glass substrate.

2. A method for making and using an optical waveguide comprising the steps of:
   defining on a glass substrate a polymer layer having a substantially uniform thickness and which tapers in width from a first end to a second end, the first end of the polymer layer being wider than the second end of the polymer layer;
   making said polymer layer to taper in thickness from the first end thereof to the second end thereof such that the first end of the polymer layer is thicker than the second end thereof;
   said making step comprising the step of heating the polymer layer of uniform thickness sufficiently to soften it and to cause its mass to be redistributed;
   the polymer layer being of a material that does not wet the substrate material, whereby, during the heating step, the polymer layer does not flow substantially on areas of the substrate surface not previously covered by said polymer layer;
   hardening said polymer layer to form a second polymer structure that has a tapered width and a tapered thickness;
   placing the second polymer structure and the glass substrate in an RIE reactor and reactively ion etching them, said reactive ion etching resulting in a substantial replication of the configuration of the second polymer structure in an upper surface of said glass substrate, whereby a first glass structure is formed in the upper surface of said glass substrate;
   and using said first glass structure as an optical waveguide.

3. The method of claim 2 wherein:
   said substrate comprises a lower layer of relatively low refractive index glass and an upper layer of relatively high refractive index glass;

said second polymer structure is formed on the upper layer of said substrate;

and the reactive ion etch step results in a replication of the configuration of the second polymer structure in said upper layer of said glass substrate.

4. The method of claim 3 wherein:

said reactive ion etch step results in a complete etching of that portion of the upper layer which was not initially masked by said second polymer structure.

5. A method for coupling lightwaves between a first optical device having a relatively large optical waveguiding means and a second optical device having a relatively smaller optical waveguiding means comprising the steps of:

defining a first structure on a substrate of a polymeric material, the first structure having a substantially uniform thickness and a width that tapers from a first end to a second end which is narrower than the first end;

tapering the thickness of the first structure comprising the step of heating the first structure sufficiently to form a meniscus along substantially its entire length, thereby to cause the polymeric material in the first structure to be redistributed and to have a tapered thickness that is a function of its width;

hardening the polymeric material of the first structure to form a second structure;

reactively ion etching the second structure and the substrate so as to replicate the configuration of the second structure in an upper surface of the substrate, thereby to define in the light-transmitting material of the substrate a tapered optical waveguide having a thick and wide first end and a thin and narrow second end;

abutting the first end of the tapered optical waveguide to the first optical device and the second end of the tapered optical waveguide to the second optical device;

and using the tapered optical waveguide to transmit lightwaves between the first optical device and the second optical device.

6. The method of claim 5 wherein:

the step of defining the first structure comprises the step of photolithographically masking and developing the polymer material of the first structure.

7. The method of claim 6 wherein:

the substrate comprises a lower layer of glass and an upper layer of glass, the glass of the upper layer having a higher refractive index than the glass of the lower layer;

said second structure is formed on the upper layer of said substrate;

and the reactive ion etch step etches results in a replication of a configuration of the second structure in said upper layer of said glass substrate.

8. The method of claim 7 wherein:

the reactive ion etch step etches all of said second structure.

9. The method of claim 8 wherein:

the reactive ion etch step etches all of the upper layer not originally covered by said second structure.

10. The method of claim 6 wherein:

the polymer material is a photoresist material.

11. A method for making and using tapered optical waveguides comprising the steps of:

coating a substrate surface with a first layer of a first material of substantially uniform thickness;

photolithographically defining in the first layer a first structure having a substantially uniform thickness, a length dimension significantly longer than its width dimension, a first wide portion and a second narrow portion, the width of the first structure tapering between the first and second portions;

heating the first structure sufficiently to liquefy a part thereof and causing the first material to redistribute within the first structure and cause the thickness of the first structure to taper as a function of its width;

hardening the first material to form a second structure having a thickness that tapers as a function of width;

using the second structure to define a path for the propagation of light; wherein:

the substrate is made of glass;

the second structure is made of polymer;

and the second structure and the substrate are subjected to an etching process, the etching resulting in a substantial replication of the configuration of the first structure in an upper portion of said glass substrate.

12. The method of claim 11 wherein:

said replication in said glass substrate constitutes a glass waveguide having a length which is longer than its width; and the using step comprises using the glass waveguide to propagate light in the length direction.

* * * * *